Feb. 7, 1956  J. M. KELLY  2,733,539
SELF-SETTING FISHHOOK
Filed June 16, 1952
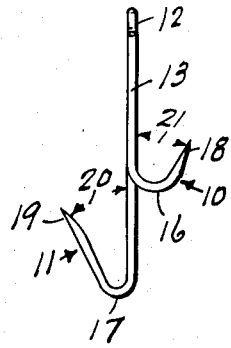
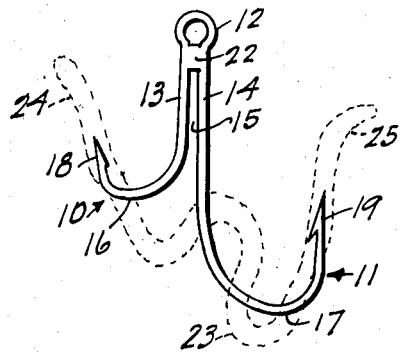
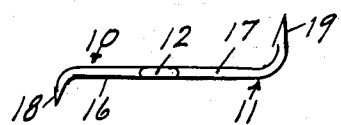
INVENTOR.
Joseph M Kelly
BY Philip A. Friedell
Attorney

United States Patent Office 2,733,539
Patented Feb. 7, 1956

2,733,539
SELF-SETTING FISHHOOK
Joseph M. Kelly, Felton, Calif.
Application June 16, 1952, Serial No. 293,756
1 Claim. (Cl. 43—44.82)

This invention relates to improvements in fish hooks, and provides a new type of double hook which, through the thrashing of the fish engaged by one of the hooks will cause the other hook to engage exteriorly of the fish's mouth, or if both hooks are taken, causing the other hook to engage in a relatively opposite location in the mouth.

This hook also provides a medium for lively baiting of the hook with angle worms inasmuch as the two ends of the worm can be impaled on the respective barbs with the intermediate portion of the worm wound loosely about the two hooks to permit wriggling, and thus being more effective in luring the fish.

In the present invention, unlike previously marketed double hooks which are usually the same size, this fish hook is made up of two hooks of different sizes, the one hook being about twice as large as the other, and which feature is important for the specific reason that the one hook will engage in spaced relation to the other and thus cause a more efficient anchorage of the hook.

Though the hook can be made from two fish hooks of different sizes with the shanks welded or soldered together, it will lack the efficiency of this invention inasmuch as the barbs will have the normal lateral offset and there will be no resiliency in the shanks. This invention requires an excess lateral offset of the barbs for more direct later engagement with the fish's mouth, and requires the resiliency to cause the barbs to pass over bony structures in the fish's mouth when initially engaged.

The objects and advantages of the inventions are as follows:

First, to provide a fish hook consisting of two hooks of different sizes rigidly connected to a single eye and oppositely disposed with one hook setting the other hook by the thrashing of a fish after striking the other hook.

Second, to provide a fish hook as outlined in which one hook is substantially half the size of the other hook.

Third, to provide a fish hook as outlined in which the barbs are laterally angularly offset at an excessive angle for tilting action of the hooks to make both hooks operative when one hook is struck by a fish.

Fourth, to provide a fish hook as outlined which is formed of a single length of wire with the one hook half the size of the other and formed with an eye at the juncture of the shanks, and with the shanks slightly spaced and fixedly connected at the lower end of the eye for providing resilient and deflectable shanks on both hooks.

Fifth, to provide a double fish hook as outlined in which the lateral angular offset of the barbs is approximately 30 degrees to the shank.

In describing the invention reference will be had to the accompanying drawings, in which:

Fig. 1 is a front elevation of the invention showing a worm in dotted lines impaled on the barbs.

Fig. 2 is a side elevation of Fig. 1.

Fig. 3 is a top plan view of Fig. 1.

The invention can be made of two hooks of different sizes with the smaller hook having a length not in excess of 60% of that of the larger hook as measured from the center of the eye to the lowest point on the return bend with the shanks welded together and having a common eye, but such construction would lack the efficiency of the one shown because of lack of individual resiliency in the shanks and because of lack of lateral angular offset, and therefore the preferred and most efficient form is shown in which the two hooks 10 and 11 are formed of a single piece of wire which have an eye partially formed intermediate its length as indicated at 12 with the shanks 13 and 14 continuing therefrom in slightly spaced relation as indicated at 15, this spacing being substantially equal to the thickness of the wire to provide individual resiliency in the shanks for selective deflection, thence continuing into the return portions 16 and 17 of the hooks which extend substantially co-planar with the transverse axis of the eye and terminate in barbs 18 and 19 which are laterally angularly offet in opposite directions at an angle of not less than 30 or more than 45 degrees approximately 35 degrees being most efficient, and which is in excess of the conventional offset, the angularity being indicated at 20 and 21. This angle is important in creating rotation of the double hook when struck or thrashed to cause the other hook to engage either in an opposite position in the mouth of the fish, or to engage exteriorly of the head or mouth of the fish.

To provide for the resiliency of the shanks and to complete the eye 12 the shanks are joined just at the lower end of the partial eye, either by means of a narrow clip or by soldering or welding a narrow section as indicated at 22 which leaves practically the entire length of each shank free for resilient deflection to provide for creepage over bony structures to engage efficiently.

It will also be noted that the hook is ideal for baiting with angle worms as indicated at 23 as the two end portions 24 and 25 of the worm can be impaled on the two barbs 18 and 19, the intervening portion being loosely draped about the return bend portions of the hooks, leaving the worm mostly free for luring the fish through its wriggling action.

I claim:

A self-setting fish hook comprising two fish hooks of different sizes having a common eye and each having a return bend, a point and a barb, and a shank with the shanks disposed parallel and spaced apart, said shanks having a short spacer having a width substantially equal to the thickness of the shank and welded therebetween at the lower end of the eye for rigidity at the eye and to form a complete eye while maintaining resiliency in the spaced shanks, said spacer having thickness equal to the thickness of the shank to maintain the shanks free of projection and entirely smooth within the vicinity of the eye, the smaller one of said fish hooks having a total length not in excess of 60% of that of the larger hook as measured from the center of the eye to the lowest points of the return bends of the respective hooks, and said shanks and said return bends to said lowest portion being formed in opposition and co-planar with the transverse axis of the eye, with said points projecting upwardly, and outwardly in opposite directions substantially at right angles to said co-planar portions, for efficient setting when struck by a fish.

References Cited in the file of this patent
UNITED STATES PATENTS

| | | |
|---|---|---|
| 754,349 | Scott | Mar. 8, 1904 |
| 1,249,342 | Dahl | Dec. 11, 1917 |
| 1,357,678 | Bain | Nov. 2, 1920 |
| 1,513,011 | Russell et al. | Oct. 28, 1924 |
| 2,215,613 | Hathaway | Sept. 24, 1940 |
| 2,563,554 | Roy | Aug. 7, 1951 |
| 2,573,018 | Herrick | Oct. 30, 1951 |
| 2,645,054 | Taylor | July 14, 1953 |

FOREIGN PATENTS

| | | |
|---|---|---|
| 16,438 | Great Britain | 1908 |
| 525,891 | France | Sept. 28, 1921 |